Figure 2:
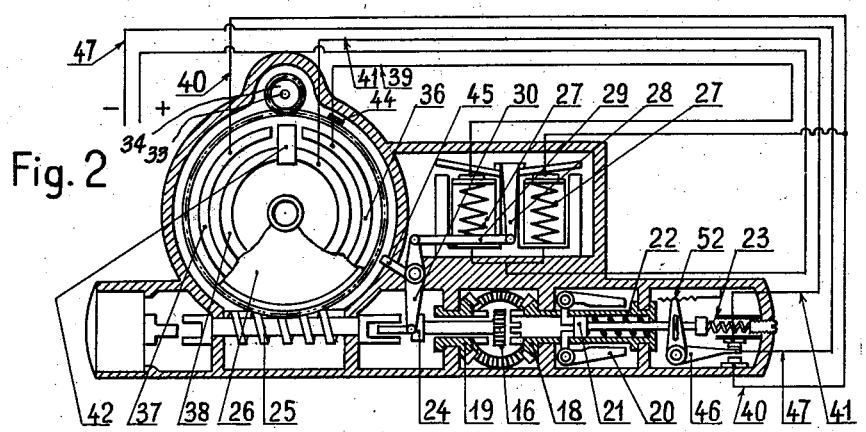

Dec. 15, 1942.    C. D'ASCANIO    2,305,146

VARIABLE PITCH AIRSCREW

Filed Oct. 19, 1939

Inventor:
Corradino D'Ascanio
by Singer, Ehlert, Stern
and Carlberg
Attorneys

Patented Dec. 15, 1942

2,305,146

UNITED STATES PATENT OFFICE 2,305,146

VARIABLE PITCH AIRSCREW

Corradino D'Ascanio, Pisa, Italy; vested in the Alien Property Custodian

Application October 19, 1939, Serial No. 300,213
In Italy October 31, 1938

8 Claims. (Cl. 170—163)

The invention relates to improvements in adjustable propellers.

It is an object of the invention to provide a propeller having adjustable propeller blades with improved electromagnetically operated means for varying the pitch of the blades during flight. Another object of the invention is to provide means for permitting the pilot to manually control the electromagnetically pitch varying means. Still another object of the invention is to provide means for automatically adjusting the pitch of the propeller as soon as the same exceeds a predetermined maximum number of revolutions. Furthermore, the propeller of the present invention is equipped with a supplementary control means, which in addition to serving as an emergency control, is used for effecting a full feathering arrangement of the propeller blades.

The invention will be best understood from the following description and from the accompanying drawing which shows by way of example one embodiment of the invention.

Figure 1:
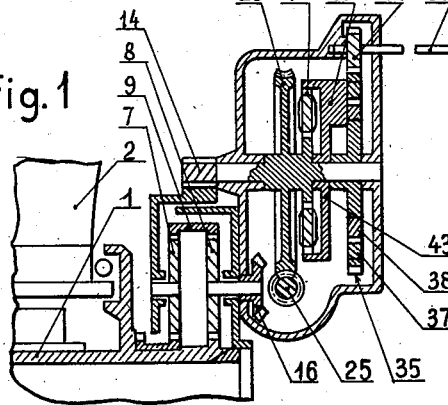
Figure 1A:
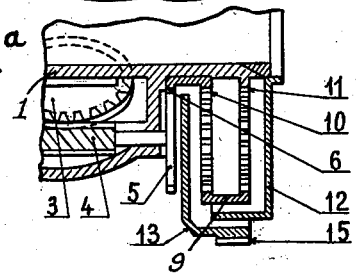

In the drawing:

Fig. 1 is a section through the upper portion in a plane passing through the engine axis and the axis of a blade of the propeller.

Fig. 1ª is a section through the lower portion in a plane passing through the engine axis and through the axis of an endless screw which adjusts a propeller blade.

Figure 3:
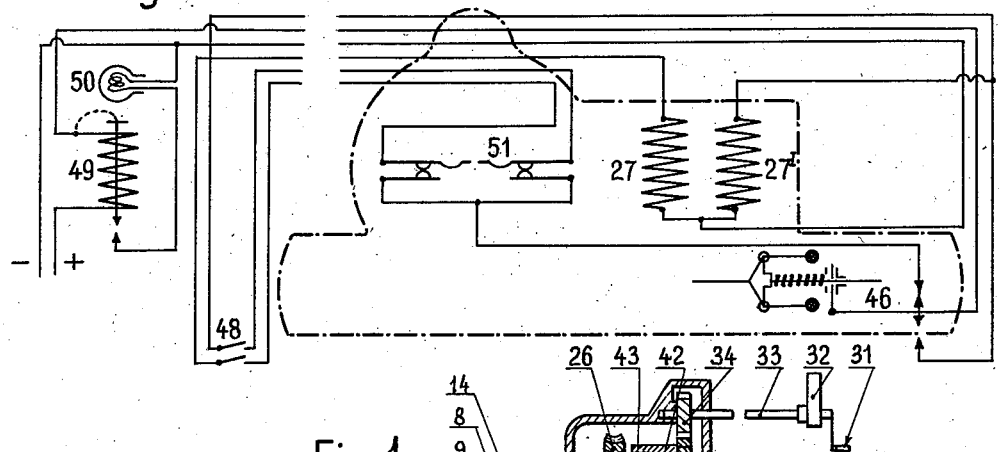

Fig. 2 shows a section of the control taken in a plane normal to the engine axis, and Fig. 3 shows an example of electric wiring diagram.

According to the embodiment illustrated, the invention comprises a hub constituted by the body 1 to which the propeller blades 2 are anchored, with the base of which latter is integral a sector of a worm gear 3 geared with an endless screw 4 supported by the said hub.

A gearing drives the endless screws 4; it is composed of gears 5 keyed to the axes of the endless screws 4, said gears meshing with a gear 6 loosely mounted on the driving shaft. Co-axial and integral with the gear 6 and therefore loose upon the driving shaft, there is a gear 10. A gear 11 of the same size as gear 10 is keyed to the driving shaft.

With the gears 10 and 11 there are respectively in mesh two sets of planetary gears 7 and 8 of like diameter, both of which are in mesh with an internally toothed rim 9. The shafts carrying the planetary gears 8 are supported by a circular plate 12 which is integral with the casing, whereas the shafts carrying the planetary gears 7 are supported by a dish-shaped plate 13 rotatably mounted on the circumference of the stationary plate 12. The plate 13 is adapted to be rotated from the outside by means of a pinion 14 which meshes with the gear teeth 15 on the outer circumference of the rim of the dish-shaped plate 13.

Due to the connection between the two sets of planetary gears, an angular displacement of the plate 13 causes a rotation of the integral gears 6 and 10 with respect to the gear 11, and therefore the endless screws 4 effect an adjustment of the blades.

According to Fig. 1 the planetary gear 8 rotated by the gear 11 on the propeller hub 1 is coaxially connected with a bevel gear 16 meshing with the bevel gears 18 and 19 which as shown in Fig. 2 are in axial alinement with each other. The bevel gear 18 is a part of a centrifugal regulator provided with two pivotally mounted weights 20 which strive through the action of centrifugal force to axially displace a rod 21 and to oppose the action of springs 22, 23 or the like. The ends of the two bevel gears 18, 19 which face each other are provided with suitable clutch teeth which alternately may be brought in engagement with corresponding teeth on a slidable shaft 24. This shaft 24 extends axially slidable through the bevel gear 19 but is angularly locked to the endless screw 25, the latter meshing with the worm-wheel 26 which is integral with a shaft on which the pinion 14 is fixedly secured which drives the plate 13.

The axial engaging movement of the shaft 24 to effect a rotation of the screw 25 is obtained through the action of two electromagnets 27, 27¹, whose armatures are connected with the shaft 24 by means of the linkage 28, 29, 30. Depending upon which one of the two bevel gears 18 or 19 is connected with the shaft 24, the latter is rotated in one direction or the other to vary the pitch of the propeller.

The control on the part of the pilot takes place as follows: By means of a handle 31 attached to a pitch indicator 32 provided within the pilot's reach, the shaft 33 is rotated, which by means of the pinion 34 rotates a gear 35, which is co-axial with the worm gear 26. On the body of said gear 35 are disposed two sectors of a circular rim 36, 37 (Fig. 2) and a complete circular rim 38 made of electrically conductive material; the said sectors are mutually insulated from each other and are also insulated from the body of said wheel 35. Suitable contact brushes affixed to the rear cover of the casing containing the worm gear 26 and associated gears are in engagement respectively with the three above-mentioned sectors. Furthermore the said contact brushes are connected to conductors 39, 40, 41. In addition thereto a contact brush 42 is provided which engages the ring 38 and by sweeping over same may electrically connect this ring 38 with the sector 37 or with the sector 36. In the position of the brush 42 as indicated in Fig. 2, it leaves the sectors 38, 37 and 36 insulated from each other. The brush 42 is caused to rotate, for instance, by the worm gear 26 through the medium of suitable transmission gearing 43.

It will be clear that through the manipulation of the handle 31 the angular position of the sectors is varied, thereby permitting the connection of the ring 38 with either of the sectors 37 or 36, which connection takes place by means of the brush 42. In the first instance the electromagnet 27 will be excited and then there will be brought about the mechanical coupling of the screw 25 and shaft 24 with the bevel gear 18, the pitch of the blades being thus varied in one direction until the brush 42 has been returned to its initial position illustrated in Fig. 2. In this initial position the current is interrupted, the mechanical coupling with bevel gear 18 is disconnected and the blade movement stopped. In the second instance, however, when a contact is established between the ring 38 and the sector 36 the electromagnet 27¹ will be excited and the pitch variation will occur in a direction opposed to the preceding one, until—as stated above— the brush 42 is brought into its initial position in which the three elements 36, 37, 38 are disconnected from each other.

Furthermore, the gearing 18 has radially disposed around its circumference and in suitable locations, corresponding to the minimum and maximum pitch position, two teeth 44, which during the rotation thereof, proceed to strike against a lateral arm 45 of the lever 30, thereby causing a disengagement of the shaft 24 from the bevel gears 18 or 19 as the case may be independently of the electric circuit.

The centrifugal governor controls an electric switch 46 which establishes, in case of propeller speeds which are below a predetermined maximum, a contact between the conductor lead 47 coming from the battery and the conductor lead wire 41 connected to the ring 38. When the rotative speed of the propeller reaches the speed for which the centrifugal regulator has been adjusted, the switch 46 is actuated to break the connection between the leads 47 and 41, and when the speed of the propeller increases still more a connection is established between the conductor lead 47 and the conductor lead 40. This result is an excitation of the electromagnet 27 which controls the coupling for the blade adjustment. Evidently, as it is this coupling which gives rise to an increase of the pitch of the propeller blades there will automatically be re-established the speed rate for which the centrifugal governor is adjusted under which condition the contact between the conductor leads 47 and 40 will be broken and a further adjustment of the blade will stop.

In order to prevent incomplete and uncertain contacts and a sparking between the switch contacts resulting from such faulty contacts the switch lever 46 is so pre-disposed as to have appertaining spring retraction organs 52 or the like, whose operation is schematically represented in the Figure 2.

According to the diagram illustrated in Fig. 3 the functioning of the switch actuated by the centrifugal governor is identical with that already described; but this diagram illustrates additionally a variation consisting solely in the direct control of the electromagnets 27 and 27¹ by means of a switch 48 without the employment of the contact brush 42. When the electromagnets 27 or 27¹ are being excited by means of the switch 48 an increase or a decrease of the pitch of the propeller blade is thus brought about. Upon each occurrence of a pitch adjustment, the electromagnet 49 closes a circuit energising a small tell-tale lamp 50 or some other signal. The electric circuit furthermore includes a disengaging mechanism which interrupts the circuit as often as the propeller blades attain their predetermined extreme angular position.

Having now particularly described and ascertained the nature of my said invention and in what manner the same is to be performed, I declare that what I claim is:

1. In a controllable pitch propeller, the combination of a casing, a propeller shaft rotatably supported by said casing, a hub on said shaft, variable pitch blades mounted in said hub, a gearing mounted on said hub for rotating the blades to change their pitch, a housing fixedly attached to said casing, a centrifugal governor in said housing, means for drivingly connecting the propeller shaft with said centrifugal governor, said housing also containing two electromagnets for controlling the pitch varying operation of said gearing, a gearing within said housing and in geared connection with said pitch varying gearing on said hub, coupling means operated by said electromagnets for connecting the drive connection which operates the centrifugal governor with the gearing in said housing, and means forming electric circuits for energising said electromagnets, said means including a switch controlled by said centrifugal governor which at a speed below a predetermined speed closes said switch to energise one of said two electromagnets and which at a speed above said predetermined speed energises the other electromagnet, whereby the former operates said coupling means to effect an operation of the gearing in said housing in one direction, while the other electromagnet, when energised, operates said coupling means to cause a rotation of said last named gearing in the opposite direction, thus causing an automatic adjustment of the propeller blades first in one direction and upon an excess increase in speed in the opposite direction until said switch is maintained open by said centrifugal governor.

2. In a controllable pitch propeller, the combination of a casing, a propeller shaft rotatably supported by said casing, a hub on said shaft, variable pitch blades mounted in said hub, a gearing mounted on said hub for rotating the blades to change their pitch, a housing fixedly attached to said casing, a centrifugal governor in said housing, means for drivingly connecting the propeller shaft with said centrifugal governor, said housing also containing two electromagnets for controlling the pitch varying operation of said gearing, a gearing within said housing and in geared connection with said pitch varying gearing on said hub, coupling means operated by said electromagnets for connecting the drive connection which operates the centrifugal governor with the gearing in said housing, means forming electric circuits for energising said electromagnets, said means including a switch controlled by said centrifugal governor which at a speed below a predetermined speed closes said switch to energise one of said two electromagnets and which at a speed above said predetermined speed energises the other electromagnet, whereby the former operates said coupling means to effect an operation of the gearing in said housing in one direction, while the other electromagnet, when energised, operates said coupling means to cause a rotation of said last named gearing in the opposite direction, thus causing an automatic adjustment of the propeller blades first in one direction and upon an excess increase in speed in the opposite direction until said switch is maintained open by said centrifugal governor, and manually operable means for selectively energising said electromagnets independently of the switch controlled by said centrifugal governor to vary thereby the pitch of the propeller blades.

3. In a controllable pitch propeller, the combination of a casing, a propeller shaft rotatably supported by said casing, a hub on said shaft, variable pitch blades mounted in said hub, a gearing mounted on said hub for rotating the blades to change their pitch, a housing fixedly attached to said casing, a centrifugal governor in said housing, means for drivingly connecting the propeller shaft with said centrifugal governor, said housing also containing two electromagnets for controlling the pitch varying operation of said gearing, a gearing within said housing and in geared connection with said pitch varying gearing on said hub, coupling means operated by said electromagnets for connecting the drive connection which operates the centrifugal governor with the gearing in said housing, means forming electric circuits for energising said electromagnets, said means including a switch controlled by said centrifugal governor which at a speed below a predetermined speed closes said switch to energise one of said two electromagnets and which at a speed above said predetermined speed energises the other electromagnet, which the former operates said coupling means to effect an operation of the gearing in said housing in one direction, while the other electromagnet, when energised, operates said coupling means to cause a rotation of said last named gearing in the opposite direction, thus causing an automatic adjustment of the propeller blades first in one direction and upon an excess increase in speed in the opposite direction until said switch is maintained open by said centrifugal governor, and manually operable means for selectively energising said electromagnets independently of the switch controlled by said centrifugal governor to vary thereby the pitch of the propeller blades, said manually controllable means including a manually rotatable switch plate within said housing coaxial with a gear of the gearing adapted to be operated when said coupling means is operative, contact elements electrically insulated on said switch plate and connected with said electric circuit forming means, and a rotatable contact member actuated by said last named gear, whereby selectively either circuit of said electromagnets may be closed by a relative movement between said switch plate and said contact member.

4. A controllable pitch propeller as claimed in claim 3, including a transmission gearing between the gear which is arranged coaxial to the manually rotatable switch plate and the rotatable contact member which is adapted to connect selectively two contact elements on said switch plate.

5. In a controllable pitch propeller, the combination of a propeller shaft, a hub on said shaft, variable pitch blades mounted in said hub, means on said hub for rotating the blades to change their pitch, a casing in which said propeller shaft is supported, a housing attached to said casing, a centrifugal governor in said housing, a gearing connecting said propeller shaft with said centrifugal governor, said gearing including a bevel gear driven by said propeller shaft and meshing with a bevel gear on the governor, a loosely rotatable bevel gear in axial alinement with the bevel gear on said governor and meshing with said driven bevel gear, coupling teeth on both ends of said axial alined bevel gears, said housing containing also two electromagnets for controlling the pitch varying means on said hub, a worm gearing within said housing and in geared connection with said pitch varying means on said hub, a coupling member slidably mounted between said axial alined bevel gears for selectively engaging either one of the coupling teeth on the latter, said coupling member being drivingly connected with said worm gearing, a linkage connecting said electromagnets with said coupling member for controlling the movement of the latter, means forming electric circuits for energising said electromagnets, said means including a switch controlled by said centrifugal governor which at a speed below a predetermined speed closes said switch to energise one of said two electromagnets and which at a speed above said predetermined speed energises the other electromagnet, whereby the former shifts said coupling member in engagement with the coupling teeth of one of said axially alined bevel gears to effect a rotation of said worm gearing in one direction, while the other electromagnet, when energized, moves said coupling member in engagement with the coupling teeth on the other bevel gear so as to rotate said worm gearing in the opposite direction, thus causing an automatic adjustment of the propeller blades first in one direction and upon an excess increase in speed in the opposite direction until said switch is maintained open by said centrifugal governor.

6. In a controllable pitch propeller, the combination of a propeller shaft, a hub on said shaft, variable pitch blades mounted in said hub, means on said hub for rotating the blades to change their pitch, a casing in which said propeller shaft is supported, a housing attached to said casing, a centrifugal governor in said housing, a gearing connecting said propeller shaft with said centrifugal governor, said gearing including a bevel gear driven by said propeller shaft and meshing with a bevel gear on the governor, a loosely rotatable bevel gear in axial alinement with the bevel gear on said governor and meshing with said driven bevel gear, coupling teeth on both ends of said axial alined bevel gears, said housing containing also two electromagnets for controlling the pitch varying means on said hub, a worm gearing within said housing and in geared connection with said pitch varying means on said hub, a coupling member slidably mounted between said axial alined bevel gears for selectively engaging either one of the coupling teeth on the latter, said coupling member being drivingly connected with said worm gearing, a linkage connecting said electromagnets with said coupling member for controlling the movement of the latter, means forming electric circuits for energising said electromagnets, said means including a switch controlled by said centrifugal governor which at a speed below a predetermined speed closes said switch to energise one of said two electromagnets and which at a speed above said predetermined speed energises the other electromagnet, whereby the former shifts said coupling member in engagement with the coupling teeth of one of said axially alined bevel gears to effect a rotation of said worm gearing in one direction, while the other electromagnet, when energised, moves said coupling member in engagement with the coupling teeth on the other bevel gear so as to rotate said worm gearing in the opposite direction, thus causing an automatic adjustment of the propeller blades first in one direction and upon an excess increase in speed in the opposite direction until said switch is maintained open by said centrifugal governor, and manually operable means for selectively energising said electromagnets independently of the switch controlled by said centrifugal governor to vary thereby the pitch of the propeller blades.

7. In a controllable pitch propeller, the combination of a propeller shaft, a hub on said shaft, variable pitch blades mounted in said hub, means on said hub for rotating the blades to change their pitch, a casing in which said propeller shaft is supported, a housing attached to said casing, a centrifugal governor in said housing, a gearing connecting said propeller shaft with said centrifugal governor, said gearing including a bevel gear driven by said propeller shaft and meshing with a bevel gear on the governor, a loosely rotatable bevel gear in axial alinement with the bevel gear on said governor and meshing with said driven bevel gear, coupling teeth on both ends of said axial alined bevel gears, said housing containing also two electromagnets for controlling the pitch varying means on said hub, a worm gearing within said housing and in geared connection with said pitch varying means on said hub, a coupling member slidably mounted between said axial alined bevel gears for selectively engaging either one of the coupling teeth on the latter, said coupling member being drivingly connected with said worm gearing, a linkage connecting said electromagnets with said coupling member for controlling the movement of the latter, means forming electric circuits for energising said electromagnets, said means including a switch controlled by said centrifugal governor which at a speed below a predetermined speed closes said switch to energise one of said two electromagnets and which at a speed above said predetermined speed energises the other electromagnet, whereby the former shifts said coupling member in engagement with the coupling teeth of one of said axially alined bevel gears to effect a rotation of said worm gearing in one direction, while the other electromagnet, when energised, moves said coupling member in engagement with the coupling teeth on the other bevel gear so as to rotate said worm gearing in the opposite direction, thus causing an automatic adjustment of the propeller blades first in one direction and upon an excess increase in speed in the opposite direction until said switch is maintained open by said centrifugal governor, and manually operable means for selectively energising said electromagnets independently of the switch controlled by said centrifugal governor to vary thereby the pitch of the propeller blades, said manually controllable means including a manually rotatable switch plate in axial alinement with the worm gear of said worm gearing, contact elements on said switch plates and connected with said electric circuit forming means, and a rotatable contact member operated by said worm gear, whereby selectively either circuit of said electromagnets may be closed by a relative movement between said switch plate and said contact member.

8. A controllable pitch propeller as claimed in claim 7, including a transmission gearing between the worm gear of said worm gearing and said rotatable contact member which is adapted to selectively connect two contact elements on said switch plate, said transmission gearing being provided with two projections adapted to actuate in two predetermined pitch positions of the propeller blades the electromagnetically controlled linkage which operates said coupling member to move it positively into an inoperative position and thus stop a further adjustment of the blades.

CORRADINO D'ASCANIO.